Jan. 15, 1957  D. N. MANZATUIK  2,777,591
TIRE CARRIERS FOR TRUCKS
Filed April 19, 1955  2 Sheets-Sheet 1

INVENTOR,
D. N. Manzatuik

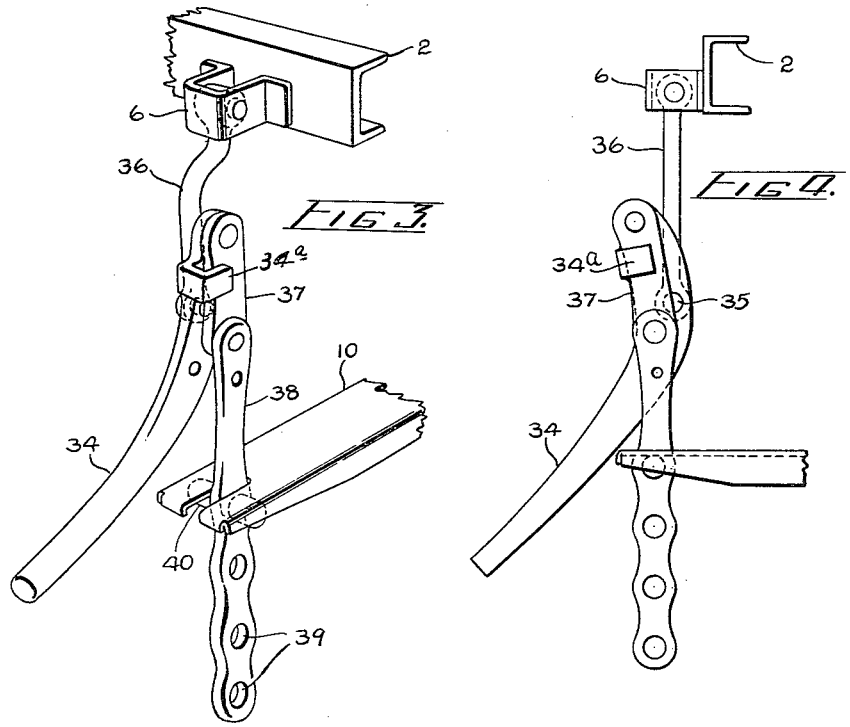
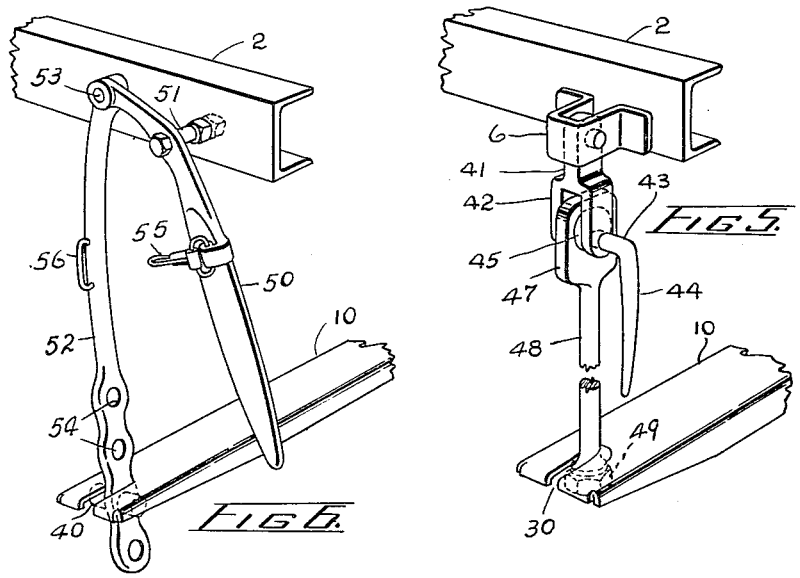

United States Patent Office 2,777,591
Patented Jan. 15, 1957

2,777,591
TIRE CARRIERS FOR TRUCKS

David Nick Manzatuik, Toronto, Ontario, Canada, assignor to Emil E. Schlesinger, Toronto, Ontario, Canada Application April 19, 1955, Serial No. 502,291

1 Claim. (Cl. 214—451)

The invention relates to improvements in spare tire carriers for trucks and other vehicles wherein the body overhangs the rear axle and provides a convenient location therebeneath for a spare tire, or tires.

Previously known carriers, particularly those of the type wherein a leverage member provides the holding pressure, have not provided the degree of adjustment to make readily possible the carrying of more than one tire nor has it been practicable in carriers of such type to safely hold, without auxiliary tire gripping means, a tire which has been deflated, and in most cases the heretofore known carriers have been of a complex and costly nature.

The main object of the invention is to provide a spare tire carrier of simple construction having an extensive range of preliminary adjustment whereby the device may be adapted to the carrying of more than one tire and further having a simple leverage locking adjustment independent of said preliminary adjustment whereby the load can be quickly clamped to the chassis, or released therefrom, in a single operation.

A further important object of the invention is the provision of novel adjusting means whereby any desired degree of tilt of the tire support may be had to facilitate the insertion and removal of the tire and further, to make more convenient the application of an air hose nozzle to the tire valve.

And generally the objects of the invention are to provide an efficient, easily adjustable tire carrier of sturdy and inexpensive construction.

With the above and other objects in view the invention consists in the novel features of construction, arrangements and combinations of parts set out in the present specification and more particularly pointed out in the claim for novelty following.

In describing the invention reference will be had to the accompanying drawings, in which:

Figure 3 is a fragmentary perspective view showing a modified form of adjustable support for one end of the tire supporting plate and the final raising and locking device, the latter being in partially open condition.

Figure 4 is an end elevation showing the structure of Figure 3 in its locked condition.

Figure 5 is a fragmentary perspective view showing another modification of the tire clamping device in an open condition.

Figure 6 is a fragmentary perspective view showing still another modification of the tire clamping means.

Like numerals of reference indicate corresponding parts in the various figures.

Figure 1:
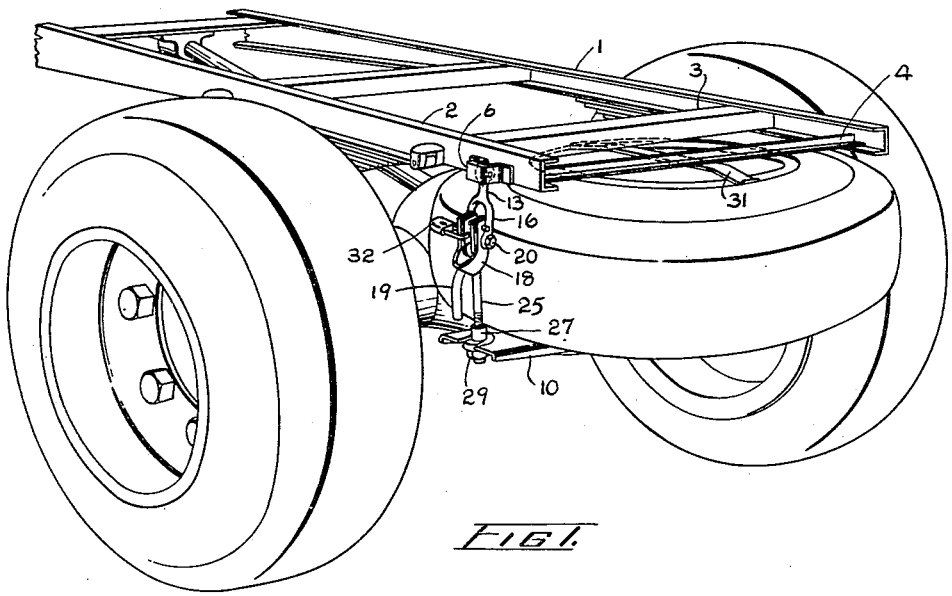
Figure 1 is a perspective view of the rear part of a vehicle chassis with my improved adjustable spare tire carrier lockingly applied to a tire.
Figure 2:
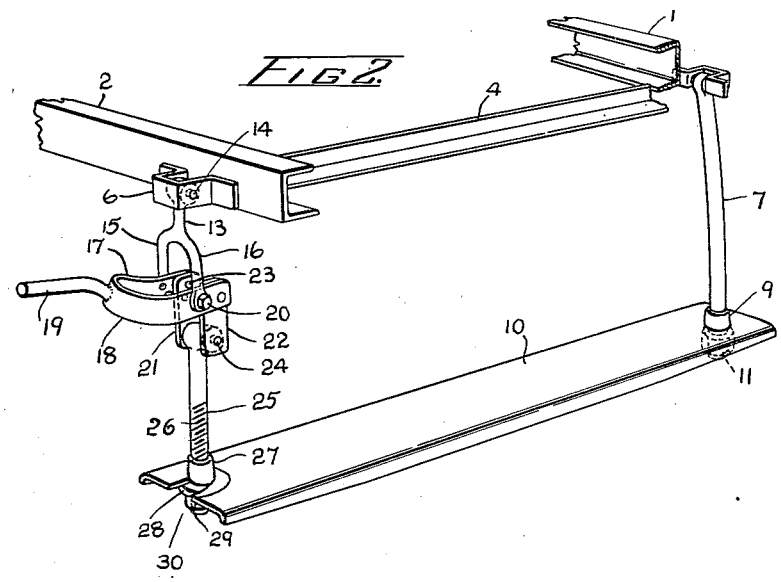
Figure 2 is perspective view showing my spare tire carrier in its open condition.

Referring to the drawings and particularly first to Figures 1 and 2 in which a complete embodiment of the invention is shown, 1 and 2 respectively denote the side members of the vehicle frame which overhang the rear axle and are connected near their rear ends by spaced cross members 3 and 4.

5 and 6 are hollow brackets secured to the outer sides of the frame members 1 and 2, respectively, in opposition to one another. 7 is a downwardly depending tubular leg which is pivotally mounted at its top end in the bracket 5 and has its lower end passed loosely through a collar 9 which extends through the tire supporting plate 10, near one end of the latter. The tire supporting plate 10 is slidable on the leg 7 so as to be movable to any desired position thereon depending on the depth of tire, or tires, to be carried, so as to lie beneath and provide the support for the tire, or tires, at that side of the vehicle. The tire supporting plate is held against withdrawal over the lower end of the leg 7 by any suitable means, such for instance, as by the use of a nut 11 screwing onto the lower end of the leg.

Depending from the bracket 2 for swinging movement towards and away from the vehicle is a supporting member of substantially inverted-Y shape, the stem 13 of which is swingingly mounted on a pin 14 journaled in the front and rear walls of the bracket, and the arms 15 and 16 of which extend downwardly and have pivotal connection at their lower ends with the inwardly extending arms 17 and 18 respectively, of a leverage member 19 through the medium of pins 20 extending laterally from said arms 17 and 18 at points somewhat removed from the ends of said arms. Strap-like links 21 and 22 have pivotal connection at their one ends, as at 23, with the arms 17 and 18, respectively, at points endwise of said arms in respect to the pivotal connections between said arms and the arms 15 and 16, and depend downwardly and at their lower ends are connected by a transverse pin 24 from which swingingly depends for movement towards and away from the vehicle frame a leg 25 which constitutes the support for the tire supporting plate 10 at that side of the vehicle.

The arms 17 and 18 are curved from their ends to the points of connection with the handle 19 so that said arms, to which the links 21 and 22 are pivoted, may be swung freely on their bearings by means of said handle upwardly and downwardly to move the points of pivotal connection with the links 21 and 22 to either side of the fulcrum points 20 of said arms and so either close or open the carrier, according to the direction in which said handle is swung.

The leg 25 is threaded from its lower end for a considerable distance, as at 26, and carries loosely thereon a collar 27 which extends loosely through the plate 10 and has an annular flange 28 around its lower end on which the plate 10 is adapted to lie. A nut 29 threading onto the lower end of the leg 25 prevents accidental withdrawal of the plate over the end of the leg and also provides the means for holding the tire supporting plate to any position on the said leg to which it may be adjusted.

In order that the tire supporting plate 10 may be readily tilted to facilitate the insertion, or the removal, of the tire without the user having to bear the entire weight of the tire, the end of the plate is slotted inwardly from its end, as at 30, to allow the disengagement of the plate from its supporting flange 28 without the necessity of unscrewing the nut 29.

In the use of this invention, assuming that the carrier is open, as shown in Figure 2, and a tire is to be locked in position and, assuming further that the carrier was last used to accommodate a single tire, in which case the collar 27 is in such position that when the end of the tire supporting plate 10 is brought to its position on the flange 28 the space between the said plate and the cross members 3 and 4 of the chassis will be very slightly greater than the depth of the tire. The tire may be lifted into position on the plate 10 or, the slotted end of the plate 10 may be disengaged from its support by simply swinging the leg 25 out of the slot 28 in said plate, upon which the plate can be brought to an inclined position with its slotted end resting on the ground, in which case the tire can be readily tipped into position on the plate, after which the end of the plate can be raised and the leg 25 swung into its position in the slot 30 where the end of the plate will rest on the flange 28. The handle 19 is next swung downwardly to cause the arms 17 and 18 of the leverage member to pivot on their bearings 20 and thus swing the points of pivotal connection with the links 21 and 22 upwardly and outwardly across the fulcrum points of said arms. The effect of this movement of the handle 19 and the arms 17 and 18 which comprise the leverage member is to raise the plate 10 and this moves the tire upwardly into firm engagement with the cross members 3 and 4 of the vehicle frame and hold it to such position until released by an upward swing of the handle 19 which causes the ends of said arms to which the links 21 and 22 are pivoted to swing on the pins 20 to their alternate position, when the pressure against the tire is released. The tire can now be removed from the carrier by either pulling it outwardly while the plate is in its horizontal position or after the slotted end of the plate 10 has been disengaged from the supporting leg and the plate allowed to come to a tilted position.

If considered advisable a downwardly bowed leaf spring 31 may be inserted beneath the frame members 3 and 4 to provide downward pressure against the tire when the tire is raised to its locked position.

It is preferable that means, such as a padlock 32, be used to lock the leverage member to its holding position and to this end two relatively moving parts such, for instance, as the arm 18 and the link 22 may be provided with suitable apertures adapted to register in the overlapping positions of these parts to provide a passage for the link of a padlock.

In the embodiment of the invention shown in Figures 3 and 4 the leverage member comprises a single curved arm 34 having pivotal connection, as at 35, at a point not far removed from its inner end with the lower end of an arm 36 which at its top end is swingingly supported in the bracket 6 carried by the frame part 2. The arm 34 has pivotal connection at its extreme inner end with the top end of a single link 37 and this link at its lower end is pivotally connected to the top end of a downwardly depending flat-sided leg 38, which latter is intended to pass through the slot 30 in the end of the plate 10. The leg 38 is provided with a series of vertically spaced apertures 39 adapted for selective positioning just beneath the plate 10, in which position relative to said plate the leg is held by means of a pin 40 extended through the aperture just beneath the plate and providing a rest for the plate at each side of the leg.

The leverage member 34 is preferably provided with an angular finger 34a adapted to overlay the link 37 to hold the parts against relative displacement.

In the last described embodiment of the invention the carrier is brought to its tire holding position by simply forcing the handle end of the member 34 downwardly and inwardly, thus causing the inner end of said member and consequently the top end of the link 37 to swing outwardly beyond the pivot 35 and thus raise the plate 10 and cause it to be held to its raised tire clamping position until the handle is again raised to swing the top end of said link inwardly across the pivot point 35 when the upward pressure of the plate 10 against the tire will be released to permit removal of the tire. In order to alter the distance between the tire supporting plate 10 and the cross members of the chassis it is simply necessary to remove the pin 40 from the hole 39 in which it has been at rest and place it in the opening which is substantially the required distance from the said cross members. It is obvious that as the slotted end of the plate moves in either direction on its supporting leg the opposite end of said plate will move a like distance along the leg 7.

In the embodiment of the invention shown in Figure 5 the tire clamping means comprises an arm 41 swingingly suspended from the bracket 6 and having a forked lower part 42 providing bearings for the horizontal arm 43 of an elongated handle 44. The horizontal arm 43 has fixed thereon between the arms of the forked member a disc 45 eccentric thereto and rotatable in a direction at right angles to the frame side member 2 in an opening through the top end 47 of a leg 48. The leg 48 is movable into and out of the slot 30 in the tire supporting plate 10 and has threading thereon a nut 49 on which the end of the plate 10 is adapted to rest, the said nut being threadable along the leg so as to provide for preliminary adjustment of the plate 10 in respect to the cross members of the chassis.

Figure 6 shows still another embodiment of the invention. In this case a leverage member 50 is pivoted near one end on a pin 51 which extends from the frame member 2 and this lever has pivotal connection at its inner end with a leg 52 through the medium of a pin 53. The leg 52 and the lever 50 are preferably bowed slightly in respect to one another and the leg is provided with openings 54 in spaced relation to each other lengthwise of the leg from the lower end, such openings corresponding to the openings 39 in the leg 38 shown in Figures 3 and 4 and being for selective engagement by a pin 40 to permit adjustment of the tire supporting plate 10.

The lever 50 preferably has a snap fastener 55 adapted for cooperation with an eye 56 carried by the leg 52 for the purpose of holding the leg against the downward pressure applied by the tire.

While I have illustrated and described the present preferred forms of construction for carrying out my invention, these are capable of variation and modification without departing from the spirit of the invention. I, therefore, do not wish to be limited to the precise details of construction set forth, but desire to avail myself of such variations and modifications as come within the scope of the appended claim.

What I claim is:

In a carrier for supporting a tire beneath the frame of a vehicle, a tire supporting plate extending transversely of the vehicle frame, a leg depending downwardly at one side of said frame and extending loosely through said plate, a nut screwing onto the lower end of said leg and supporting said plate at one end thereof, said plate at its other end having a slot extending inwardly thereof, an arm swingingly depending from the vehicle frame at the side opposed to that at which said leg is positioned, said arm terminating in an inverted-U-shaped part providing parallel arms, a second, relatively short, leg extending through said plate within said slot therein, said second leg being threaded externally from its lower end, means threading onto said threaded lower end of said second leg and providing an adjustable support for said plate, a horizontally disposed pivot pin extending laterally from opposite sides of said second leg in a direction parallel to the longitudinal axis of the vehicle frame, a pair of links pivotally mounted at their lower ends on said pivot pin in spaced relation to one another, said links overlapping the ends of said parallel arms of said swingingly mounted arm at the inner sides of said parallel arms, and a handled leverage member including spaced parallel arms having pivotal connection intermediate their ends with the said parallel arms of said swingingly mounted arm and having pivotal connection at their ends beyond the face of said swingingly mounted arm towards the vehicle frame with said links whereby movement of the handle part of said leverage member in a downward arc will cause upward movement of said second leg to raise said tire supporting plate and bring the tire thereon to a clamped position between said plate and the frame of the vehicle.

References Cited in the file of this patent

UNITED STATES PATENTS

| | | |
|---|---|---|
| 347,101 | Ferry | Aug. 10, 1886 |
| 1,234,286 | Chambers | July 24, 1917 |
| 1,421,573 | Schaefer | July 4, 1922 |
| 2,449,544 | Ballard | Sept. 21, 1948 |
| 2,563,810 | Ballard | Aug. 14, 1951 |
| 2,679,961 | Brewer | June 1, 1954 |